(12) United States Patent
Stone

(10) Patent No.: US 6,422,440 B1
(45) Date of Patent: Jul. 23, 2002

(54) FOOD HOLDING AND SERVING DEVICE

(76) Inventor: Brian K. Stone, 5410 MC Road 302, Maywood, MO (US) 63454

( * ) Notice: Subject to any disclaimer, the term of this patent is extended or adjusted under 35 U.S.C. 154(b) by 0 days.

(21) Appl. No.: 09/780,005

(22) Filed: Feb. 9, 2001

(51) Int. Cl.[7] ................................................. B60R 7/04
(52) U.S. Cl. .................... 224/275; 224/539; 296/37.15; D12/416; D12/419; D12/423; D12/424; D12/425; D12/426
(58) Field of Search ................................ 224/275, 539; 296/37.8, 37.15; D12/416, 419, 423, 424, 425, 426

(56) References Cited

U.S. PATENT DOCUMENTS

| 3,909,092 | A | | 9/1975 | Kiernan | |
|---|---|---|---|---|---|
| 4,106,829 | A | | 8/1978 | Dolle et al. | |
| D290,548 | S | | 6/1987 | Stambler | |
| 4,832,241 | A | * | 5/1989 | Radcliffe | 224/275 |
| 4,949,890 | A | * | 8/1990 | Schultz | 224/275 |
| 5,007,569 | A | | 4/1991 | Zarb | |
| D329,944 | S | | 10/1992 | Longtin | |
| D351,585 | S | * | 10/1994 | Scheurer | D12/424 |
| 5,460,102 | A | | 10/1995 | Pasmanick | |
| 5,479,892 | A | * | 1/1996 | Edwards | 119/771 |
| D373,754 | S | * | 9/1996 | Pinterpe | D12/424 |
| 5,551,616 | A | | 9/1996 | Stitt et al. | |

FOREIGN PATENT DOCUMENTS

DE 4203503 A1 * 8/1993 .................. 224/275

* cited by examiner

Primary Examiner—Gregory M. Vidovich

(57) ABSTRACT

A food holding and serving device for holding food and other articles within a vehicle for use by a child. The food holding and serving device includes a housing having a bottom wall, a front wall, a back wall, a first side wall, a second side wall, and a top wall. The top wall has a pair of openings therein positioned generally adjacent to the back wall. Each of the openings in the top wall is positioned generally adjacent to one of the first and second side walls. A top peripheral lip is attached to and extending upwardly from the top wall. A bottom peripheral lip is coupled to and extends downward from the bottom wall. The bottom peripheral lip has a pair of apertures therein. Each of the apertures is positioned generally adjacent to one of the first and second side walls. A seat belt may be extended through the apertures in the bottom peripheral lip to secure the device to a seat.

9 Claims, 3 Drawing Sheets

FOOD HOLDING AND SERVING DEVICE

BACKGROUND OF THE INVENTION

1. Field of the Invention

The present invention relates to children's food serving devices and more particularly pertains to a new food holding and serving device for holding food and other articles within a vehicle for use by a child.

2. Description of the Prior Art

The use of children's food serving devices is known in the prior art. More specifically, children's food serving devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,007,569; U.S. Pat. No. 5,551,616; U.S. Pat. No. 4,106,829; U.S. Pat. No. 3,909,092; U.S. Pat. No. 5,460,102; U.S. Des. Pat. No. 329,944; and U.S. Des. Pat. No. 290,548.

While these devices fulfill their respective, particular objectives and requirements, the aforementioned patents do not disclose a new food holding and serving device. The inventive device includes a housing having a bottom wall, a front wall, a back wall, a first side wall, a second side wall, and a top wall. The top wall has a pair of openings therein positioned generally adjacent to the back wall. Each of the openings in the top wall is positioned generally adjacent to one of the first and second side walls. A top peripheral lip is attached to and extending upwardly from the top wall. A bottom peripheral lip is coupled to and extends downward from the bottom wall. The bottom peripheral lip has a pair of apertures therein. Each of the apertures is positioned generally adjacent to one of the first and second side walls. A seat belt may be extended through the apertures in the bottom peripheral lip to secure the device to a seat.

In these respects, the food holding and serving device according to the present invention substantially departs from the conventional concepts and designs of the prior art, and in so doing provides an apparatus primarily developed for the purpose of holding food and other articles within a vehicle for use by a child.

SUMMARY OF THE INVENTION

In view of the foregoing disadvantages inherent in the known types of children's food serving devices now present in the prior art, the present invention provides a new food holding and serving device construction wherein the same can be utilized for holding food and other articles within a vehicle for use by a child.

The general purpose of the present invention, which will be described subsequently in greater detail, is to provide a new food holding and serving device apparatus and method which has many of the advantages of the children's food serving devices mentioned heretofore and many novel features that result in a new food holding and serving device which is not anticipated, rendered obvious, suggested, or even implied by any of the prior art children's food serving devices, either alone or in any combination thereof.

To attain this, the present invention generally comprises a housing having a bottom wall, a front wall, a back wall, a first side wall, a second side wall, and a top wall. The top wall has a pair of openings therein positioned generally adjacent to the back wall. Each of the openings in the top wall is positioned generally adjacent to one of the first and second side walls. A top peripheral lip is attached to and extending upwardly from the top wall. A bottom peripheral lip is coupled to and extends downward from the bottom wall. The bottom peripheral lip has a pair of apertures therein. Each of the apertures is positioned generally adjacent to one of the first and second side walls. A seat belt may be extended through the apertures in the bottom peripheral lip to secure the device to a seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new food holding and serving device apparatus and method which has many of the advantages of the children's food serving devices mentioned heretofore and many novel features that result in a new food holding and serving device which is not anticipated, rendered obvious, suggested, or even implied by any of the prior art children's food serving devices, either alone or in any combination thereof.

It is another object of the present invention to provide a new food holding and serving device which may be easily and efficiently manufactured and marketed.

It is a further object of the present invention to provide a new food holding and serving device which is of a durable and reliable construction.

An even further object of the present invention is to provide a new food holding and serving device which is susceptible of a low cost of manufacture with regard to both materials and labor, and which accordingly is then susceptible of low prices of sale to the consuming public, thereby making such food holding and serving device economically available to the buying public.

Still yet another object of the present invention is to provide a new food holding and serving device which provides in the apparatuses and methods of the prior art some of the advantages thereof, while simultaneously overcoming some of the disadvantages normally associated therewith.

Still another object of the present invention is to provide a new food holding and serving device for holding food and other articles within a vehicle for use by a child.

Yet another object of the present invention is to provide a new food holding and serving device which includes a housing having a bottom wall, a front wall, a back wall, a first side wall, a second side wall, and a top wall. The top wall has a pair of openings therein positioned generally adjacent to the back wall. Each of the openings in the top wall is positioned generally adjacent to one of the first and second side walls. A top peripheral lip is attached to and extending upwardly from the top wall. A bottom peripheral lip is coupled to and extends downward from the bottom wall. The bottom peripheral lip has a pair of apertures therein. Each of the apertures is positioned generally adjacent to one of the first and second side walls. A seat belt may be extended through the apertures in the bottom peripheral lip to secure the device to a seat.

Still yet another object of the present invention is to provide a new food holding and serving device that may be removed from a vehicle for easy cleaning and transferring to other vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
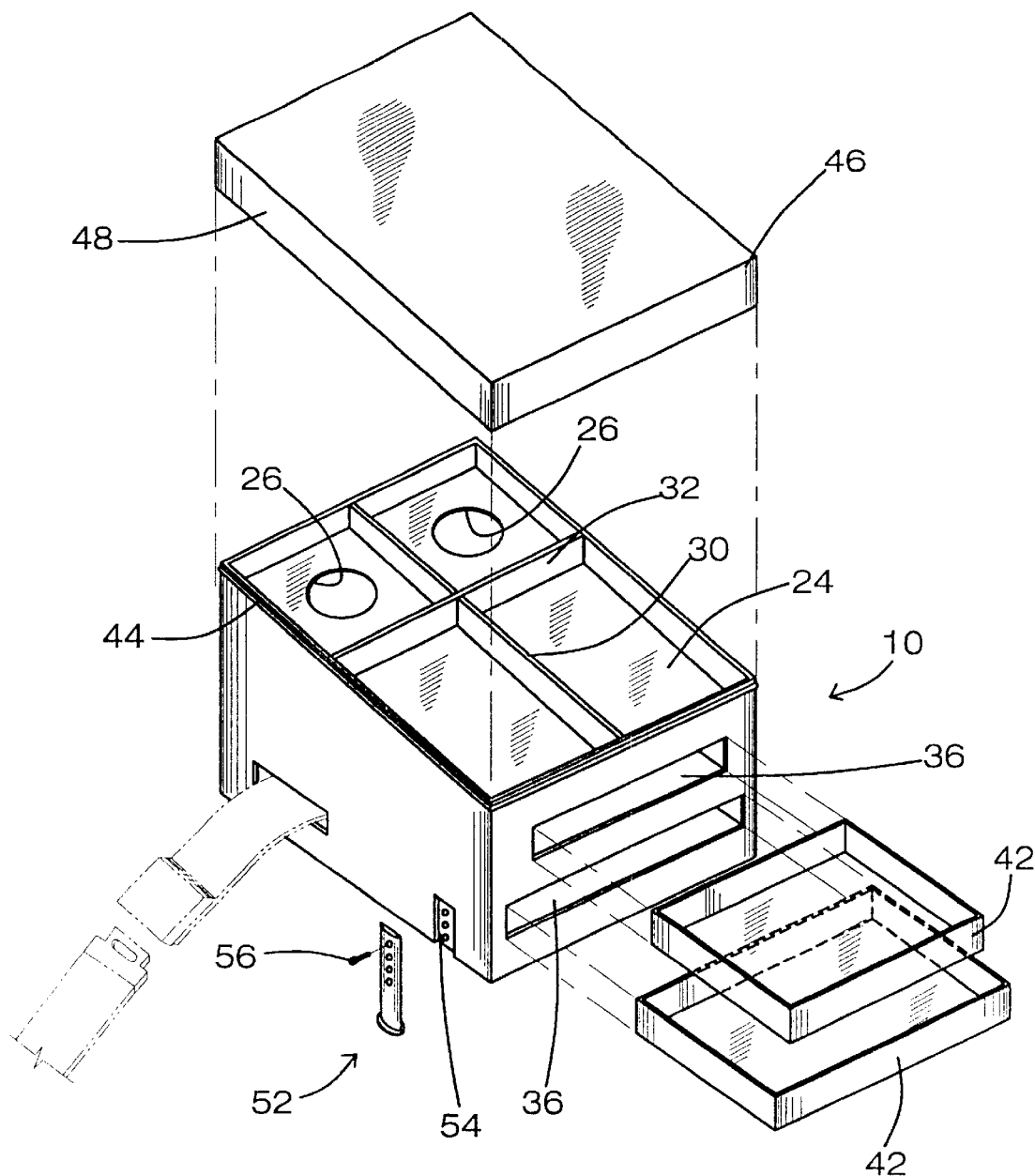
FIG. 1 is a schematic perspective view of a new food holding and serving device according to the present invention.
Figure 2:
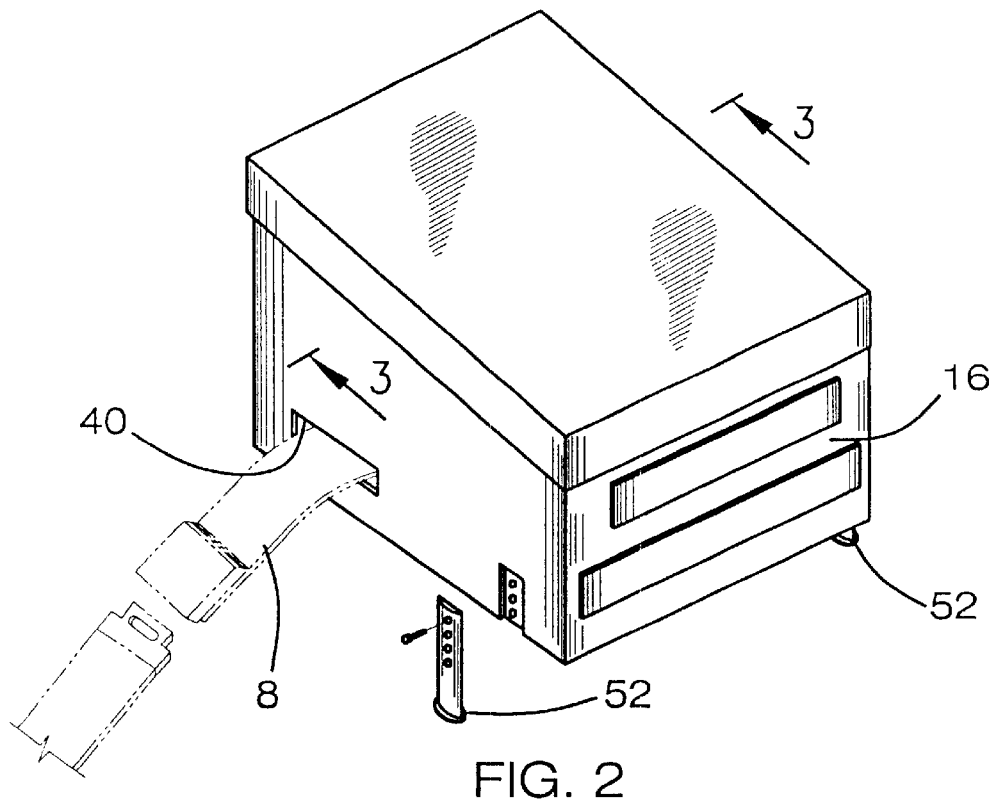
FIG. 2 is a schematic perspective view of the present invention.
Figure 3:
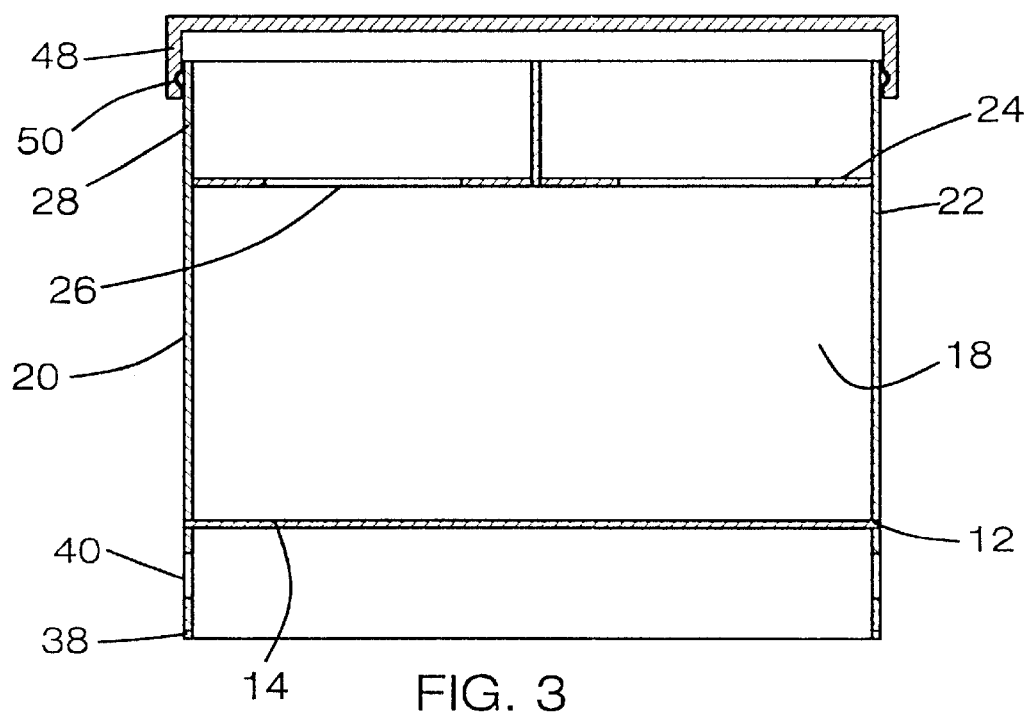
FIG. 3 is a schematic cross-sectional view taken along line 3—3 in FIG. 2 of the present invention.

With reference now to the drawings, and in particular to FIGS. 1 through 5 thereof, a new food holding and serving device embodying the principles and concepts of the present invention and generally designated by the reference numeral 10 will be described.

As best illustrated in FIGS. 1 through 5, the food holding and serving device 10 generally comprises a housing 12 having a bottom wall 14, a front wall 16, a back wall 18, a first side wall 20, a second side wall 22, and a top wall 24. The top wall 24 has a pair of openings 26 therein positioned generally adjacent to the back wall 18. Each of the openings 26 in the top wall 24 is respectively positioned generally adjacent to one of the first 20 and second 22 side walls. A top peripheral lip 28 is attached to and extends upwardly from the top wall 24. A first dividing wall 30 is attached to an inner surface of the top peripheral lip 28 and extends between the front 16 and back 14 walls. The first dividing wall 30 is positioned generally between the first 20 and second 22 side walls. A second dividing wall 32 is attached to the inner surface of the top peripheral lip 28 and extends between the first 20 and second 22 side walls. The first 20 and second 22 dividing walls traverse each other such that four compartments 34 are defined. Each of the openings 26 is positioned in one of the compartments 34. The front wall 16 has a pair of elongated slots 36 therein. Each of the slots 36 generally extends between the first 20 and second 22 side walls. The back wall 18 has a height greater than a height of the front wall 16. The bottom wall preferably has a length equal to 14 inches and a width equal to 10 inches.

A bottom peripheral lip 38 is coupled to and extends downward from the bottom wall 14. The bottom peripheral lip 38 has a pair of apertures therein 40. Each of the apertures 40 is positioned generally adjacent to one of the first 20 and second 22 side walls. A seat belt 8 may be extended through the apertures 40 in the bottom peripheral lip 38 to hold the housing 12 securely in a car seat.

Each of a pair of drawers 42 is extendably positioned in one of the elongated slots 36. The drawers 42 may be used for holding food items or other items such as writing utensils, coloring books, and other such items. Ideally, each of the slots have a compartment housing therein for receiving on the drawers.

A ridge 44 is coupled to and extends around an outer surface of the top peripheral lip 28.

A cover 46 for positioning over the top wall 24 includes a panel having a peripheral flange 48 extending downwardly therefrom. The peripheral flange 48 has an inner surface having a channel 50 therein extending around the peripheral flange 48. The cover 46 is positioned over the top wall 24 such that the peripheral flange 48 may frictionally engage the ridge 44.

Each of a pair of legs 52 is removably attachable to one of the first 20 and second 22 side walls and located generally adjacent to the front wall 16. Ideally, each of the side walls 20, 22 has a depression 54 therein for receiving the legs 52. A pin 56 may be extending through one of a plurality of openings in the legs 52 and into the corresponding side wall 20, 22. The legs allow for increasing a height of a front side of the housing in order to level the top wall.

Figure 4:
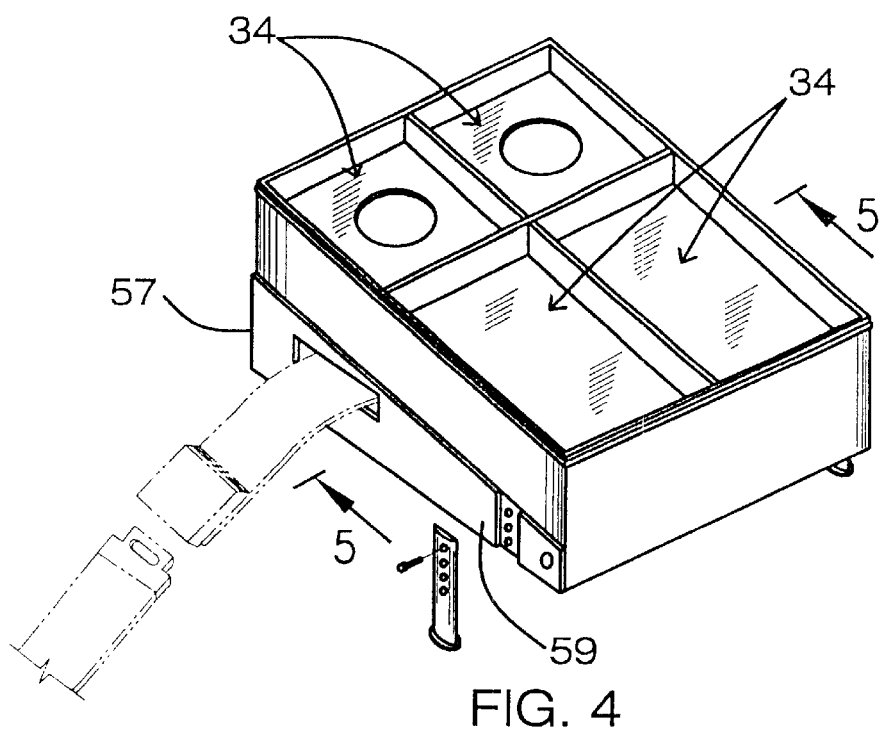
FIG. 4 is a schematic perspective view of a second embodiment of the present invention.
Figure 5:
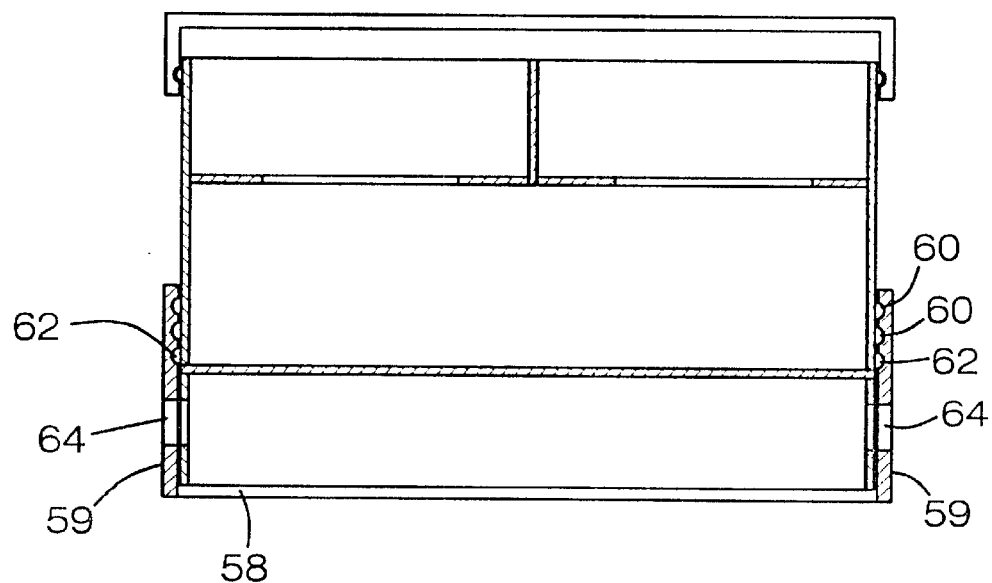
FIG. 5 is a schematic cross-sectional view taken along line 5—5 of FIG. 4 of the present invention.

A second embodiment, shown in FIG. 4 and 5, includes a base 57 having middle section 58 and a pair of legs 59 extending away from opposite ends of the middle section. Each of the legs 59 is positioned against one of the first 20 and second 22 side walls and rotatably coupled to the respectively adjacent side wall such that the middle section 58 is positioned against the back wall 18 of the housing 12. Each of the legs 59 has a plurality of depressions 60 therein each positioned for releasably receiving one of a pair of nubs 62 secured to the side walls 20, 22 of the housing. Each of the legs 59 has an aperture 64 therein positioned for extendably receiving the seat belt 8. Changing the placement of the nubs 62 with respect to the depressions 60 allows the user to change the angle of the top wall 24.

In use, the device 10 is secured to a seat by placing the seatbelt 8 through the device. The openings 26 in the top wall may hold cups and such while the drawers 42 may hold items of interest to a child. The top wall 24 is in an angular relationship for better holding of food items for a child.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage and serving device, a seat belt being extendable through said device, said device comprising:
   a housing having a bottom wall, a front wall, a back wall, a first side wall, a second side wall, and a top wall, said top wall having a pair of openings therein positioned generally adjacent to said back wall, each of said openings in said top wall being respectively positioned generally adjacent to one of said first and second side walls, a top peripheral lip being attached to and extending upwardly from said top wall; and
   a bottom peripheral lip being coupled to and extending downward from the peripheral edge of said bottom wall, said bottom peripheral lip having a pair of apertures therein, each of said apertures being positioned generally adjacent to one of said first and second side walls, wherein said seat belt may be extended through said apertures in said bottom peripheral lip.

2. The storage and serving device as in claim 1, wherein said housing further includes:
   a first dividing wall being attached to an inner surface of said top peripheral lip and extending between said front and back walls, said first dividing wall being positioned generally between said first and second side walls.

3. The storage and serving device as in claim 2, further including:
   a second dividing wall being attached to said inner surface of said top peripheral lip and extending between said first and second side walls, said first and second dividing walls traversing each other such that four compartments are defined, each of said openings being respectively positioned in one of said compartments.

4. The storage and serving device as in claim 1, further including:
   said front wall having a pair of elongated slots therein, each of said slots generally extending between said first and second side walls; and
   a pair of drawers, each of said drawers being extendably positioned in one of said elongated slots.

5. The storage and serving device as in claim 1, wherein said back wall has a height greater than a height of said front wall such that said top wall is in an angular relationship with respect to said bottom wall.

6. The storage and serving device as in claim 1, further including:
   a ridge being coupled to and extending around an outer surface of said top peripheral lip; and
   a cover for positioning over said top wall, said cover including a panel having a peripheral flange extending downwardly therefrom, said peripheral flange having an inner surface having an channel therein extending around said peripheral flange, said cover being positionable over said top wall such that said peripheral flange may frictionally engage said ridge.

7. The storage and serving device as in claim 1, further including:
   a pair of legs, each of said legs being respectively removably attachable to one of said first and second side walls and located generally adjacent to said front wall.

8. A storage and serving device, a seat belt being extendable through said device, said device comprising:
   a housing having a bottom wall, a front wall, a back wall, a first side wall, a second side wall, and a top wall, said top wall having a pair of openings therein positioned generally adjacent to said back wall, each of said openings in said top wall respectively being positioned generally adjacent to one of said first and second side walls, a top peripheral lip being attached to and extending upwardly from said top wall, a first dividing wall being attached to an inner surface of said top peripheral lip and extending between said front and back walls, said first dividing wall being positioned generally between said first and second side walls, a second dividing wall being attached to said inner surface of said top peripheral lip and extending between said first and second side walls, said first and second dividing walls traversing each other such that four compartments are defined, each of said openings being positioned in one of said compartments, said front wall having a pair of elongated slots therein, each of said slots generally extending between said first and second side walls, said back wall having a height greater than a height of said front wall, said bottom wall having a length generally equal to 14 inches and a width generally equal to 10 inches;
   a bottom peripheral lip being coupled to and extending downward from said bottom wall, said bottom peripheral lip having a pair of apertures therein, each of said apertures being respectively positioned generally adjacent to one of said first and second side walls, wherein said seat belt may be extended through said apertures in said bottom peripheral lip;
   a pair of drawers, each of said drawers being extendably positioned in one of said elongated slots;
   a ridge being coupled to and extending around an outer surface of said top peripheral lip;
   a cover for positioning over said top wall, said cover including a panel having a peripheral flange extending downwardly therefrom, said peripheral flange having an inner surface having an channel therein extending around said peripheral flange, said cover being positionable over said top wall such that said peripheral flange may frictionally engage said ridge;
   a pair of legs, each of said legs, being respectively movably attachable to one of said first and second side walls and located generally adjacent to said front wall.

9. A storage and serving device, a seat belt being extendable through said device, said device comprising:

a housing having a bottom wall, a front wall, a back wall, a first side wall, a second side wall, and a top wall, said top wall having a pair of openings therein positioned generally adjacent to said back wall, each of said openings in said top wall, being respectively positioned generally adjacent to one of said first and second side walls, a top peripheral lip being attached to and extending upwardly from said top wall;

a pair of nubs, each of said nubs, being respectively attached to one of said first and second side walls and positioned generally adjacent to said back wall;

a bottom peripheral lip being coupled to and extending downward from said bottom wall, said bottom peripheral lip having a pair of apertures therein, each of said apertures, being respectively positioned generally adjacent to one of said first and second side walls, wherein said seat belt may be extended through said apertures in said bottom peripheral lip; and a base having a middle section and a pair of legs extending away from opposite ends of said middle section, each of said legs, being respectively positioned against one of said first and second side walls, each of said legs being rotatably coupled to one of the respectively adjacent side walls such that said middle section is positioned against said back wall of said housing, each of said legs having a plurality of depressions therein each positioned for releasably receiving one of said nubs, each of said legs having an aperture therein positioned for extendably receiving said seat belt.

* * * * *